Patented Apr. 28, 1931

1,802,628

UNITED STATES PATENT OFFICE

LYLE CALDWELL, OF LOS ANGELES, CALIFORNIA, ASSIGNOR, BY MESNE ASSIGNMENTS, TO CELITE CORPORATION, OF NEW YORK, N. Y., A CORPORATION OF NEW YORK

PROCESS OF TREATING OIL

No Drawing.    Application filed June 29, 1926. Serial No. 119,472.

My invention relates to the art of refining oils such as vegetable, animal or marine, and particularly to an improvement in the art of refining petroleum oils, waxes, gums, and similar substances.

The present application is a continuation in part of my application Serial No. 62,139 filed October 12, 1925, entitled Process of treating liquids, which has matured into United States Patent 1,603,314 of October 19, 1926.

My invention has for its object an improvement in refining of petroleum oils either before, during, or after a distillation or cracking process; the facilitation of the removal of odoriferous and colored impurities; and the production of petroleum oils in a more rapid, efficient and simple manner than has heretofore been used.

In brief, my process consists in bringing petroleum oils, particularly when such oils are in the vapor phase, before, during, or after a cracking or distilling operation, into intimate contact with a granular or finely divided silica treated with a hydroxide of an alkaline earth metal, preferably lime, and thereafter separating such treated silica from the oils.

It is well known that during cracking, high boiling point hydrocarbons are reduced to low boiling point hydrocarbons. Cracked distillates are formed by the splitting of long chain saturated hydrocarbons, with the production of unsaturated hydrocarbons, such as olefins, and some free carbons. It is desirable to reduce the amount of unsaturated hydrocarbons to a minimum in order to produce a marketable product.

The most common impurities in cracked distillates, for instance gasoline, are sulphur compounds such as thiophenes, marcaptans and alkyl sulphides. It has also been recently determined that cracked distillates containing large amounts of unsaturated hydrocarbons precipitate gummy substances upon evaporation or oxidation, such precipitations being accelerated by sunlight, and that such gums are composed primarily of aldehydes which may in turn be formed by oxidation of olefins or diolefins. Such gums are very undesirable in motor fuels, such as kerosene, gasoline and light distillates, inasmuch as they have a tendency to clog carburetors of internal-combustion engines. The object of my invention is to prevent or reduce the formation of unsaturated hydrocarbons or refine petroleum oils in such manner as to inhibit the formation of such gums and at the same time decolorize and in other ways render the products of greater purity.

According to my invention, the liquid from which it is desired to remove objectionable compounds, for example, from gasoline or kerosene distillates, is first given a treatment with acid consisting in mixing or agitating with an acid such as sulphuric, and the acid then partly or wholly settled out or removed by other suitable means. Such acid treated liquid or gasoline is then brought into intimate contact with a granular or highly divided absorbent agent consisting of silica treated with a hydroxide or an alkaline earth metal. During contact of the liquid with the treated silica various impurities are removed by absorption, adsorption and by other means, the details of which are not thoroughly known at present, so that after separation of the oil from the treated silica, it will be found that the oil has been decolorized, and greatly improved in quality. The treated oil, of course, may be washed with water or with acid, alkali, and water from the above described treatment, if, and when such further treatment is desired.

My invention is also directed to the treatment of petroleum vapors liberated from pressure stills in what is called the vapor phase process of cracking and distillation. In this process, petroleum oils of high boiling point are heated in pipe or other types of stills to temperatures up to about 800° F.; I have found temperatures of from 600° F. to 1300° F. effective. The vapors liberated from such stills may be subjected to various pressures up to about 1000 lbs. to square inch. The object of my invention is to treat such petroleum vapors with an adsorptive porous silica treated with a hydroxide of an alkaline earth metal (this product being preferably produced by the method hereinafter described) either before or during the cracking process in the original pipe or batch still, or in a subsequent operation. I may add a granular alkali earth treated porous silica to the still in which the oil is vaporized and cracked, or I may pass the vapors from such still through a bed or layer of the treated silica. In all cases, the object of my invention is to bring the cracked vapors in contact with the treated silica while such vapors are at a relatively high temperature and, after such treatment, to condense and perhaps redistill or chemically refine such condensate.

During contact with the product used by me, certain constituents of the vapors will be condensed and liquefied, although the largest portion will pass through such contact bed or layer without liquefaction. It is my object to provide for the separation of the compounds liquefied by contact with the alkaline earth treated silica from such silica by any suitable straining or gravitational means, and reflux such partial condensate into the vaporizing chamber or still in which the oils are vaporized. The vapors which pass through the contact bed of treated silica are thereby purified and are condensed and treated separately.

The absorbent earth treated silica suitable for my invention may be produced from any finely divided silica such as pulverized sand or quartz or gaize, but preferably from diatomaceous earth (otherwise known as infusorial earth, kieselguhr, diatomite, or tripoli). Any alkaline earth such as calcium, magnesium, barium, etc., or a combination of alkaline earths may be used but I prefer to employ lime for economic reasons. When a water suspension of diatomaceous earth is treated with quick or hydrated lime at a temperature of about the boiling point of water, a hydrated mass comprising calcium silicate is produced. When sufficient lime is added to combine with all of the silica present in the diatomaceous earth, the product is a hydrated monocalcium silicate. This hydrated silicate may then be dried and reduced to any state of division required although the preferred form used by me is that of a coarse powder containing particles of the size of a walnut down to particles on the order of 200 mesh. In order to enhance the absorptive efficiency of the product, the hydrated mass of silicate may be calcined after drying.

In the manufacture of the treated silica, the ratio between alkaline earth hydroxide and silica may be varied considerably. Furthermore, the reaction between the hydroxide of the alkaline earth metal and silica may be stopped before completion, thereby leaving a certain quantity of the alkaline earth hydroxide in the uncombined state. Again, the product of reaction is influenced by the methods and temperatures used in drying or calcining, allowing the production of either alkaline earth oxides or carbonates from the excess alkaline earth. It will be seen therefore that the final composition of the product used by me may be varied considerably; for example, when lime is used, the product may consist wholly of $CaSiO_3$ or of $CaSiO_3$ and uncombined silica or of $CaSiO_3$, uncombined silica and $CaO$ or $CaCO_3$. Naturally, impurities present in the raw materials used may also be present in the product in small amounts. The fundamental reaction has been shown by a co-worker, Robert Calvert, in U. S. Patent 1,574,363.

When a petroleum oil which has been treated with acid, or an oil or distillate which has an acid reaction is brought, while in the vapor phase, into intimate contact with a lime treated silica such as is above described, there is a distinct neutralizing action between the alkaline constituents of the lime treated silica and the acid compounds of the oil. Furthermore, the porous nature of the lime treated silica acts as an absorbent or adsorbent for the acids or other aqueous solutions or impurities present in the oil being treated. It will be noticed that when a lime treated diatomaceous silica containing or composed of calcium silicate is brought into contact with an acid liquid it reacts therewith, forming calcium salts of the acid present and liberating colloidal silicic acid. It is well known that colloidal silicic acid is a good absorbent under certain conditions and the efficacy of my process may be influenced by the formation, during the treating operation, of such colloidal silicic acid distributed on the surfaces of a porous supporting medium. Other causes may contribute to the effectiveness of my process, but need no discussion here.

The exact conditions under which optimum results may be obtained with my invention will vary with the type of oil treated, i. e., paraffin base oils are more stable than asphalt base or naphthene base oils, etc.; the gravity of the oil; the character of the products which it is desired to produce; etc. In general from 2 to 10 lbs. of the lime treated silica will be required per barrel of oil treated, and the temperature of oil vapors should be between 600° and 1300° F. The pressure may vary from atmospheric to about 1000 lbs. per square inch, and this will influence the process and results to some extent, affecting particularly the production of aromatic hydrocarbons.

I also desire to call attention to the use of my process in combination with metallic catalysts, metals, or their oxides, such as iron, nickel, platinum, etc. Methods of using such catalysts are of record in the art, and need not be reviewed here; combination of such catalysts with the granular or finely divided treated silica as described above increases the recovery of low boiling point hydrocarbons and improves their color and purity. Hydrogen, to assist in the hydrogenation of unsaturated hydrocarbons formed during the vapor phase cracking process, may be admitted to the still or reaction chamber before or after the oil vapors pass through or are brought in contact with the alkaline earth treated silica in accordance with my invention.

What I claim is as follows:

1. In the process of cracking petroleum oils, bringing petroleum oil vapors into intimate contact with porous, finely divided, adsorptive silica which has been reacted with alkaline earth in the presence of water.

2. In the process of cracking petroleum oils, the step of bringing petroleum oil vapors in intimate contact with diatomaceous silica which has been reacted with an alkaline earth metal hydroxide in the presence of water.

3. In the process of cracking petroleum oils the step of bringing petroleum oil vapors in intimate contact with a granular product obtained by reacting diatomaceous earth with a hydroxide of an alkaline earth metal in the presence of water and then drying the product of such reaction.

4. In the process of cracking petroleum oils the step of bringing petroleum oil vapors in intimate contact with a granular product obtained by reacting diatomaceous earth with lime in the presence of water and then drying the product of such reaction.

5. A process of treating mineral oils comprising converting the oils to the vapor phase; bringing such vapors into intimate contact with porous, finely divided, adsorptive silica which has been reacted with lime in the presence of water, separating the treated vapors from such lime treated silica, condensing and separating such vapors.

6. In the process of cracking petroleum oils the step of vaporizing the oil by means of heat; passing oil vapors through a bed of porous, finely divided, adsorptive silica which has been reacted with lime in the presence of water; returning oil condensed by passage through such bed to the vaporizing chamber; and condensing vapors which passed through such bed separately.

7. A process of treating mineral oils comprising converting the oils to the vapor phase; bringing such vapors into intimate contact with diatomaceous earth, which has been reacted with lime in the presence of water, separating the treated vapors from such lime treated diatomaceous earth, condensing and separating such vapors.

8. In the process of cracking petroleum oils the step of vaporizing the oil by means of heat; passing the oil vapors through a bed of diatomaceous earth treated with lime in the presence of water; returning vapors condensed by passage through such bed to the vaporizing chamber; and condensing vapors which passed through such bed separately.

9. In the process of cracking petroleum oils the step of vaporizing the oil by means of heat; bringing such vapors into contact with the dried product of reaction between lime and diatomaceous earth in the presence of water; refluxing vapors condensed by such contact to the vaporizing chamber; and separately condensing vapors not previously condensed by contact with the lime treated diatomaceous earth.

10. A process of treating petroleum oils, consisting in subjecting the oil while in a vapor phase to contact with a reaction product of lime water and diatomaceous earth; and then removing the oil from such lime treated diatomaceous earth product.

In testimony that I claim the foregoing as my own, I affix my signature.

LYLE CALDWELL.